4 Sheets—Sheet 1.

J. B. WILLS.
MACHINE FOR FINISHING HORSESHOE NAILS.

No. 175,891. Patented April 11, 1876.

Witnesses
C. G. C. Simpson
M. A. Nelson

Inventor
John B. Wills

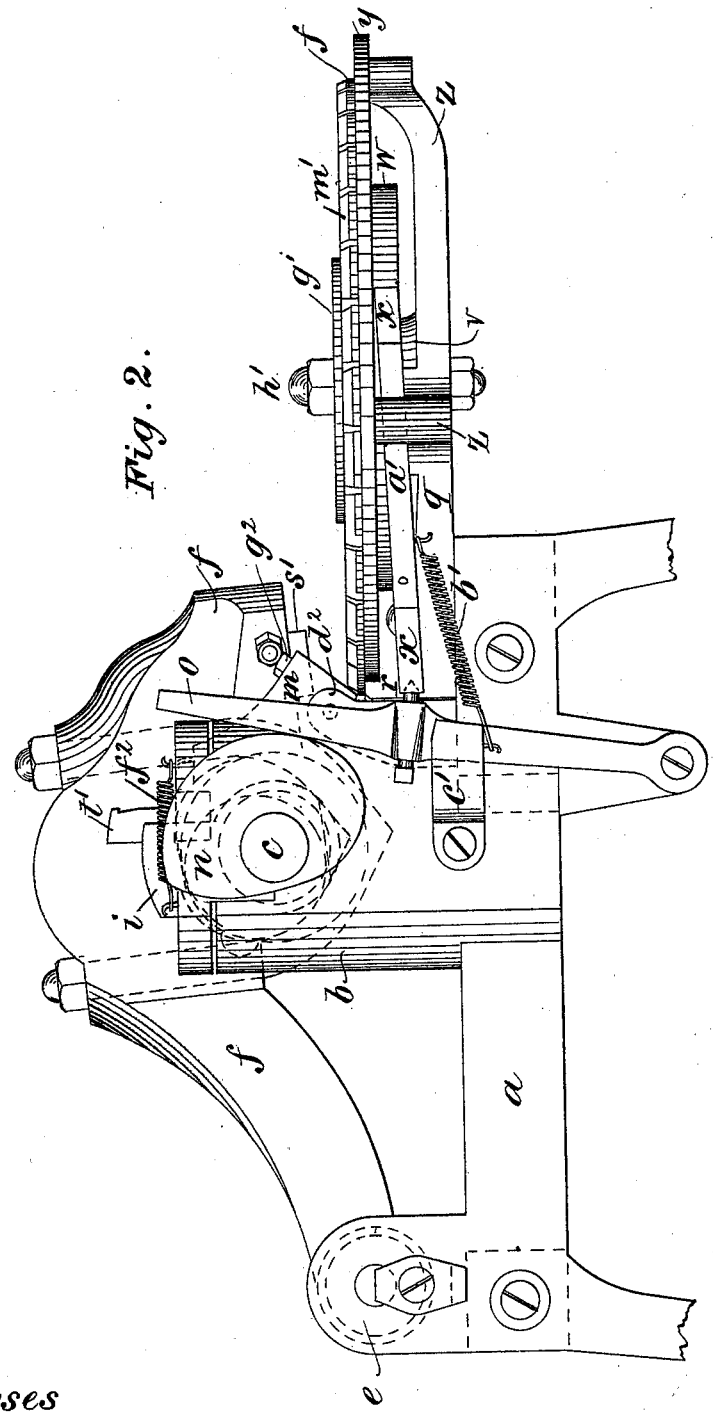

4 Sheets—Sheet 3.
J. B. WILLS.
MACHINE FOR FINISHING HORSESHOE NAILS.
No. 175,891. Patented April 11, 1876.
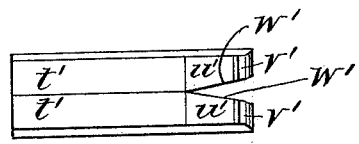
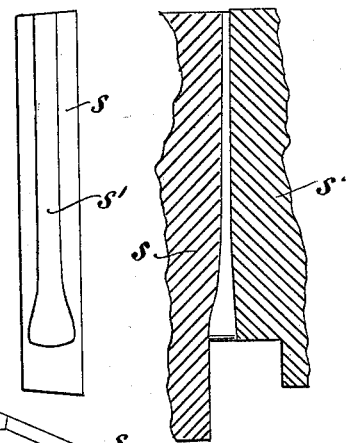
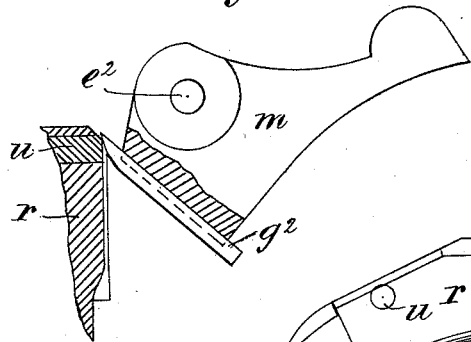
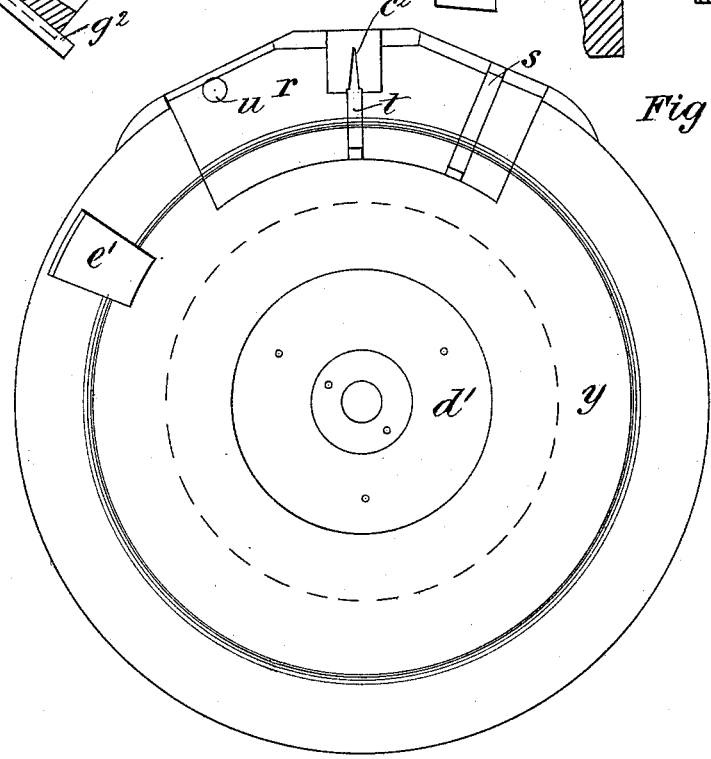
Witnesses
C. G. C. Simpson
M. A. Nelson
Inventor
John B. Wills 4 Sheets—Sheet 4.

J. B. WILLS.
MACHINE FOR FINISHING HORSESHOE NAILS.

No. 175,891. Patented April 11, 1876.

Witnesses
C. G. C. Simpson
M. A. Nelson

Inventor
John B. Wills

N. PETERS, PHOTO-LITHOGRAPHER, WASHINGTON, D. C.

UNITED STATES PATENT OFFICE.

JOHN B. WILLS, OF KEESEVILLE, NEW YORK.

IMPROVEMENT IN MACHINES FOR FINISHING HORSESHOE-NAILS.

Specification forming part of Letters Patent No. 175,891, dated April 11, 1876; application filed December 7, 1875.

*To all whom it may concern:*

Be it known that I, JOHN BOMAN WILLS, of the village of Keeseville, in the county of Essex, in the State of New York, have invented certain new and useful Improvements in Machines for Finishing or Pointing Horseshoe-Nails; and I do hereby declare that the following is a full, clear, and exact description of the same.

This invention provides a machine for treating blanks which are to be formed into horseshoe-nails, the blanks having had (by any suitable mechanism) their heads and bodies brought to the desired configuration in thickness and varying widths, and only requiring to have any improper bend or crookedness taken out of them, and their ends cut and pointed to give the point the desired finish to form a perfect nail. The machine has, therefore, a threefold action, which, after the blanks have been fed to it, presses out of them any improper bend or crookedness, bringing them on the "flat" to the required form or shape. The machine next shears or cuts the point to the exact required shape sidewise; and, lastly, it bevels the extremity of the point, all of which actions will more clearly hereinafter appear.

Figure 1:
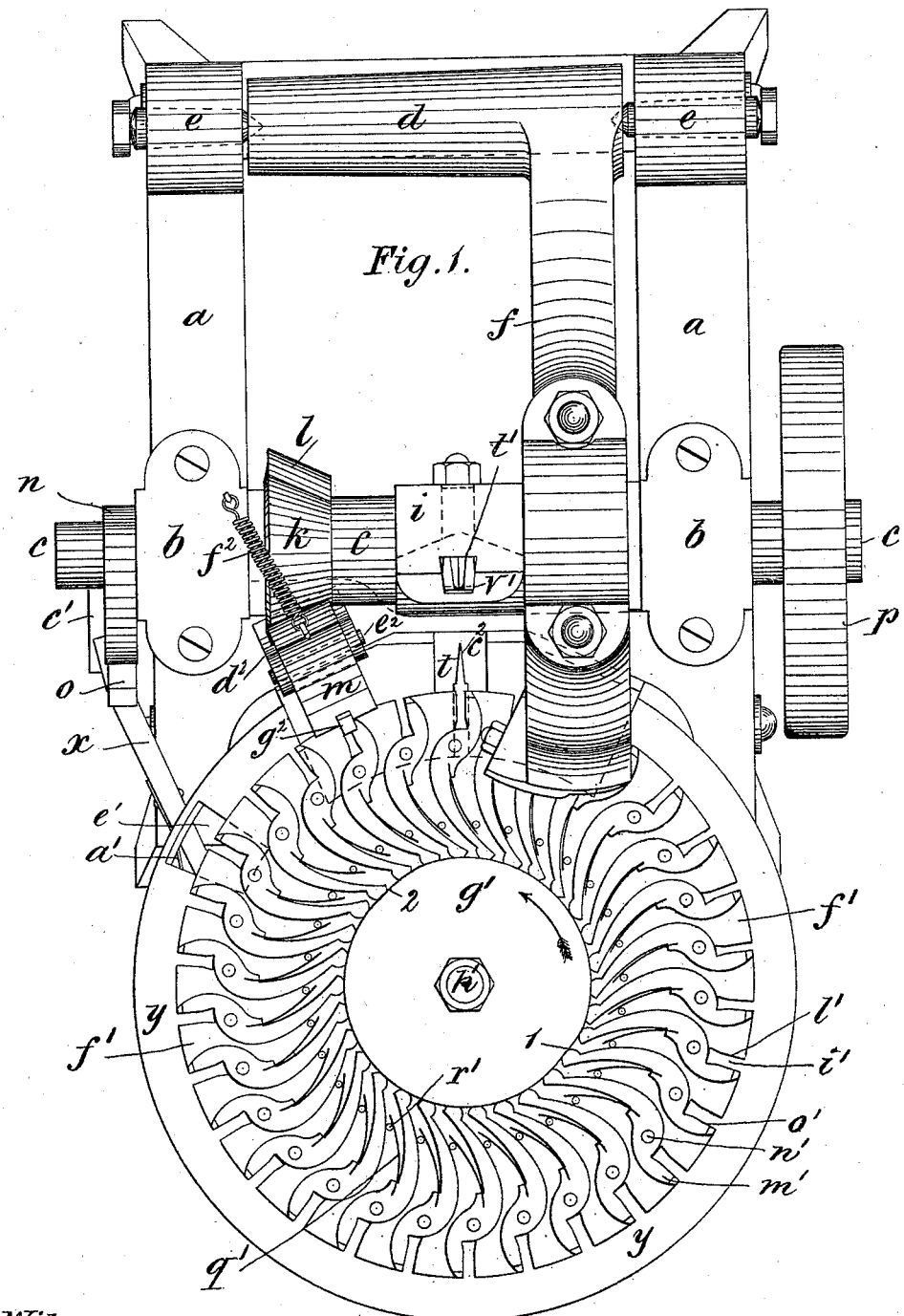
Figure 8:
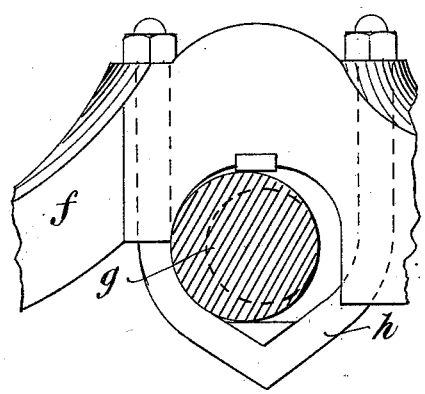
Figure 9:
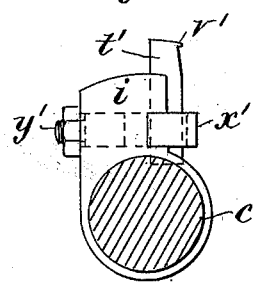
Figure 10:
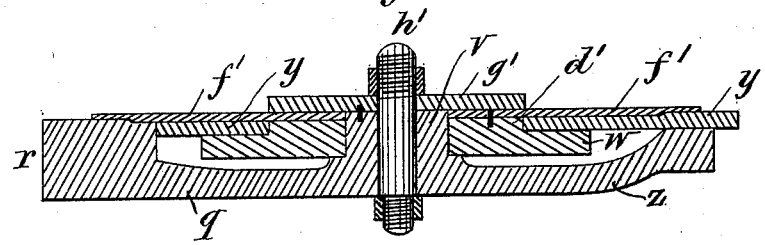
Figure 12:
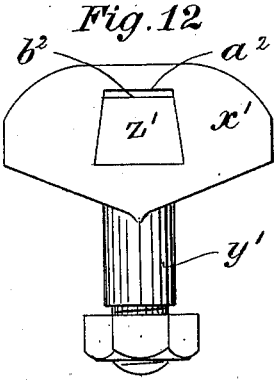
Figure 11:
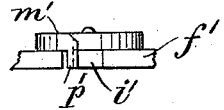

In the drawings hereunto annexed, similar letters of reference indicate like parts, and Figure 1 is a plan of a machine embodying my invention. Fig. 2 is a side elevation of Fig. 1. Fig. 3 is a detail plan. Figs. 4, 5, 6, and 7 are details of dies. Fig. 8 is a detail of arm and cam. Fig. 9 is a detail of projection and dies. Fig. 10 is a sectional detail of revolving plate, with parts thereto relating; the fingers are, however, omitted. Fig. 11 is a detail, showing in elevation a portion of the revolving plate in Fig. 10, with a finger attached. Fig. 12 is a detail of staple for holding the dies shown in Fig. 6.

Letter $a$ is any suitable frame-work for holding the moving parts, &c., in their proper relative positions. $b$ are plumber-blocks, preferably made in one, with the bed $a$, for carrying the revolving shaft $c$. $d$ is a shaft held between centers in the projection $e$ of the frame $a$. To this shaft an arm, $f$, is attached or made in one with it. The arm is of the configuration shown clearly in Figs. 2 and 8, being provided with a strap, $h$, to engage with or being acted upon by, the eccentric $g$, preferably made in one with the shaft $c$, revolving within the space formed between the strap and arm, and thus raising and depressing the arm as the eccentric revolves. $i$ is a projection made on the shaft $c$, preferably in one therewith, being of the form clearly shown in Figs. 1, 2, and 9. To this are attached dies, hereinafter described. $k$ is an enlargement of the shaft $c$, made for the purpose of accommodating the relative position of the die-carrier $m$, and provided with a cam projection, $l$, for actuating the die-carrier. $n$ is a cam formed on the part of the shaft to that end shown in the drawings, for the purpose of actuating a lever, $o$. $p$ is a pulley and balance-wheel, to rotate the shaft $c$, connected therewith in the ordinary manner.

To the front of the frame $a$ is attached a sub-frame, $q$, a part of which forms a bed, $r$, for the dies $s$ $t$, and $u$. $v$ is a central hub, formed in one with the frame $q$, on which is placed a wheel, $w$, provided with ratchet-teeth. This wheel is operated by the cam $n$ upon the shaft $c$ acting upon the lever $o$, which, in its turn, operates the pawl-bar $x$, the whole being arranged so that one revolution of the shaft $c$ will cause the wheel $w$ to advance or rotate the amount of one of the teeth of the wheel. $y$ is an annular plate carried on arms $z$ of the frame $q$. These arms $z$ are three in number, one extending to the front, as shown in Figs. 2 and 10, and two extending to the sides, only one of which appears in Fig. 2; but it will be easily understood that there is another one on the opposite side.

As shown in Fig. 2, the pawl-bar $x$ is carried on one of the arms $z$. It is kept pressed up, to engage with the teeth of the wheel $w$, by a spring, $a^1$, on its back. It is also caused to retire by means of a spring, $b^1$, attached at one end to the pawl-bar $x$, and at the other end to the guide $c^1$, for retaining the lever $o$ in its proper position on the face of the cam $n$. This guide $c^1$ consists of a simple bracket bolted to the frame $a$. Returning to the annular plate $y$, the opening in the center of it is made to fit a projection, $d^1$, on the upper side of the wheel $w$, so that the wheel can freely revolve within it. It will also be observed in Fig. 10 that the surface on the upper side of the projection $d^1$ comes fair with the surface of the annular plate $y$, and in Fig. 3 it will be seen that a piece is cut out of the annular plate $y$ to fit about the bed $r$. Another opening, $e^1$, is cut in the annular plate $y$, for the nails to fall through, as will hereinafter be more clearly described. Upon the surface formed by the upper side of the projection $d^1$ and annular plate $y$ is laid a circular plate, $f^1$, agreeing with the configuration of the surface, and having an opening fitting upon the hub $v$.

By this arrangement of the parts it will be seen that the central portion of the circular plate $f^1$ on its under side and the upper surface of the projection $d^1$ come together. They are, furthermore, attached by dowel-pins, screws, or other devices, to oblige the plate and wheel to revolve together. It will also be observed that the upper surface of the plate $f^1$ and the hub $v$ agree with one another. On this upper surface of the hub $v$ is attached, by dowel-pins or screws, (keeping it stationary with the hub,) a cam-plate, $g^1$. $h'$ is a bolt and nuts, passing through the hub and cam-plate, and further securing all the parts together. Thus it will be seen that the parts $y$ and $g^1$ are stationary, while the wheel and plate $f^1$ revolve.

The plate $f^1$ is provided with radial slots $i'$, extending all around it at equally distant intervals in the circle. Their number and the number of teeth of the wheel $w$, before described, will agree. The slots are, furthermore, configurated to have one side, $l'$, to agree with one side of the head of the nail-blank and the adjacent half of the body, the other side of the slot being sufficiently cut out to receive a projection or lip, $p'$, of the fingers, (shown in Fig. 11,) projecting downward the depth of the plate $f^1$. $m'$ are finger-pieces or levers, pivoted at $n'$ to the plate $f^1$, and of the configuration shown, having their lips $p'$ configurated to agree with the opposite side of the head and body of the nail that the side $l'$ agrees with, so a nail can be freely laid in the opening existing between the lips $p'$ and side $l'$, the fingers being rotated on their pivots, and caused to close upon the nail by their other extremities acting on the edge of the cam-plate $g$.

It will be seen in Fig. 1, by the formation of the cam $g^1$, that the action of the fingers $m'$ (to gripe a nail laid in the slots $i'$) is continued throughout the portion of the periphery of the cam from the point 1 to the point 2 on the side on which the arrow is drawn, which arrow also indicates the direction of the revolution of the plate $f^1$, while throughout the balance of the periphery the configuration of the cam allows the fingers to retire from griping the nail by a spring, $q'$, attached on each of their backs, pressing against suitable stops $r'$.

It will furthermore be observed that the point 2, above referred to, occurs a little in advance of arriving at the opening $e^1$, so that a nail that has been griped throughout the portion of the circle above described will be free to fall through the opening when it arrives at it.

It will be seen, by the action of the pawl-bar $x$, operated by lever $o$ and cam $n$, that the plate $f^1$ is made to rotate the amount of from one slot, $i'$, to the other at each revolution of the shaft $c$; and it will be also seen, by reason of the configuration of the cam $n$, that this is not a continuous motion, the plate rotating as the pawl-bar is pushed forward and remaining stationary as it retires, thereby enabling nails to be introduced in the slots in the lower part of the circle. In situating the dies $s$, $t$, and $u$ in the bed $r$, I place them to exactly agree with the positions of the slots $i'$ when the plate $f$ is at rest; they may be placed, as shown in the drawings, with one slot, $i'$, intervening between each, or without or with a greater number. The die $s$ is shown more clearly in section, on an enlarged scale, in Fig. 4, and in plan, Fig. 5, where the nail-blank is also delineated as lying upon it. Its upper surface agrees exactly with the proper configuration of the nail. $s'$ is a die attached to the end of the arm $f$, in a suitable position to come down upon the nail-blank lying upon the die $s$ in the position shown in Fig. 5, its plan being the same or nearly the same as the plan of the nail-blank; the parts being so arranged that, a nail held in position by one of the fingers $m'$ on the die $s$, the die $s'$ comes down upon the nail sufficiently close to press out any crooks or bends that may improperly exist in it, but not to crush or extend the nail in any way, the position of the cam $g$ on the shaft $c$ being arranged or timed to bring down the die $s'$ during the interval that the plate $f^1$ is at rest, as hereinbefore described. The dies $t'$, attached to the projection $i$ on the shaft $c$, are shown in end view, Fig. 1, a part side view, Fig. 2, a complete side view, Fig. 9, and under plan view, Fig. 6. They are made in two parts, the inner sides doweled together throughout their bodies, while their ends $u'$ are cut away, leaving an acute V form, as seen in Fig. 6, being the exact form that the ends of the blank nails require to be cut down to. They are also cut away on their upper sides, giving them an amount of clearance. The extremities of the ends $u'$ are also provided with projections $v'$, which come first in contact with the blank, and prevent any tendency of escape or displacement of it, being slightly beveled off before the cutting-edge, so that they enter upon the blank and bring it to the proper position, should it be slightly out, just before the cutting-edge begins to operate. These cutting-edges are shown clearly at $w'$ in Fig. 6.

The manner of attaching these dies to the projection $i$ is as follows: In the projection a horizontal recess is cut to receive a staple, $x'$, of the configuration shown in Fig. 12, and a hole being bored at the bottom of the recess for the end $y'$ to pass through and receive a nut on its screwed end for tightening up the staple. This staple is made a very "snug" fit in the recess in $i$, to receive it, so that it cannot shake or twist about. It is provided with an opening, $z'$, to receive the dies $t'$. This opening is inclined, to agree with the outer inclined sides of the dies $t'$, and is of such size that the dies will not come to the bottom $a^2$, but will come to about the position of the line $b^2$. Thus the tighter the nut is screwed upon the end $y'$, the tighter the two dies $t'$ are drawn together, and are also drawn up in their recessed bed in the projection $i$.

The die $t$, being the punch or bed-die of the dies $t'$, is provided with an upper surface, the section of which would be exactly like the section of the die $s$ in Fig. 4. Its point is exactly in plan the size and shape of the nail, but being sufficiently small not to engage with the cutting-edges $w'$ (in Fig. 6) and injure them. The dies $t'$, as will be clearly understood, revolving with the shaft $c$, bring down their ends $w'$ on each side of the point $c^2$, paring or cutting off the portions of the blank extending beyond the point $c^2$ of the die $t$. It will be seen that as the center of the shaft $c^1$ is raised at a considerable height above the level of the die $t$, and nail thereon held, the dies are enabled to give a drawing cut from the body toward the extremity of the point, in contradistinction to a dead shear-cut, which would be the case if the edges $w'$ and the points $c^2$ of the die $t$ came together in a straight line in any portion of the revolution of the dies $t'$. By this oblique action of the dies upon the nail a slight amount of bevel is given to the sides and end of the point, which could not be given by dies coming down fairly or vertically upon the nail with a dead-shear. This amount of bevel is of considerable importance in the action of the next dies about to be described. The dies $t'$ are timed in their action to cut the blank while the plate $f^1$ is stationary. The die-carrier $m$ is attached to a pivot, $e^2$, to a bracket, $d^2$, made in one or attached to the frame $a$. Its upper end rests against the projection $k$ of the shaft $c$, and is rotated on its pivot $e^2$ by the cam projection $l$, being caused to return by a spring, $f^2$. Thus, by the revolution of the shaft, a nodding action is given to the carrier, the parts being situated so that the die $g^2$ secured in the carrier will come down over the die $u$ in the bed $r$, in the manner clearly shown in Fig. 7, thereby pressing and finishing the extreme point of the nail to any desired chamfer, bevel, or angle which is determined by the configuration given to the bottom face of the die $g^2$. As the extremity of the point is compressed it is slightly widened or enlarged by the action of this die, but only to a sufficient amount to compensate for the beveling cut made by the dies $t'$, as before described, and said to be of considerable importance, so that between the two a beautifully finished and perfect point is obtained. It will be observed that, as the pivot $e^2$ is placed at a considerable angle above the end of the die $g^2$ the action of the die $g^2$, on the nail is not merely a compression, but a compression combined with a draw or rub of the die upon the point, giving a tendency to elongate rather than to widen. The die $g^2$, like the others above described, is timed to act when the plate $f^1$ is at rest. It will, therefore, be seen that the nails fed to the slots $i'$ in the plate $f^1$ are first griped by the fingers $m'$, which carry them forward and present them to the action of the dies $s\ s'$; they then carry them forward and similarly present them to the action of the dies $t\ t'$, and, lastly, present them to the action of the dies $u$ and $g^2$. The nails arriving at the opening $e^1$, being released, as hereinbefore described, fall out of the machine.

What I claim is—

1. The combination of the dies $t'$ and bed-die $t$, arranged to act obliquely, as described, with the dies $g^2$ and $u$, whereby the beveled cut of the former compensates for the widening or enlargement caused by the latter, substantially as described.

2. The revolving plate $f^1$, having openings or slots $i'$, in combination with the fingers $m'$, having lips $p$, substantially as and for the purposes set forth.

3. The combination of the revolving plate $f^1$ and fingers $m'$, holding the nail-blank throughout a portion of its circumference, with the three sets of dies $s\ s'$, $t\ t'$, and $u\ g^2$, substantially as described.

4. The combination of the plate $f^1$, fingers $m'$, and cam $g^1$, substantially as and for the purposes described.

Montreal, 30th day of November, A. D. 1875.

JOHN B. WILLS.

Witnesses:
C. G. C. SIMPSON,
M. A. NELSON.